(12) United States Patent
Takemura et al.

(10) Patent No.: US 11,091,110 B2
(45) Date of Patent: Aug. 17, 2021

(54) OCCUPANT PROTECTION DEVICE

(71) Applicant: HONDA MOTOR CO., LTD., Tokyo (JP)

(72) Inventors: Naotoshi Takemura, Wako (JP); Yoshihisa Sugamata, Wako (JP); Kazuo Imura, Wako (JP); Yusuke Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 16/494,026

(22) PCT Filed: Mar. 16, 2017

(86) PCT No.: PCT/JP2017/010559
§ 371 (c)(1),
(2) Date: Sep. 13, 2019

(87) PCT Pub. No.: WO2018/167899
PCT Pub. Date: Sep. 20, 2018

(65) Prior Publication Data
US 2020/0023801 A1    Jan. 23, 2020

(51) Int. Cl.
*B60R 21/20* (2011.01)
*B60N 3/00* (2006.01)
*B60R 21/231* (2011.01)

(52) U.S. Cl.
CPC .............. *B60R 21/20* (2013.01); *B60N 3/002* (2013.01); *B60R 2021/23153* (2013.01)

(58) Field of Classification Search
CPC ................. B60R 21/20; B60R 2021/23153
See application file for complete search history.

(56) References Cited

U.S. PATENT DOCUMENTS

| | | | | |
|---|---|---|---|---|
| 3,985,374 A | * | 10/1976 | Powaska | B60N 3/004 280/730.1 |
| 5,645,319 A | * | 7/1997 | Parks, Jr. | A47C 16/00 297/391 |
| 8,011,731 B2 | * | 9/2011 | Goddu | A47C 7/383 297/397 |
| 9,930,977 B1 | * | 4/2018 | Jennings | B64D 11/06205 |
| 10,059,296 B2 | * | 8/2018 | Farooq | B60R 21/0136 |

(Continued)

FOREIGN PATENT DOCUMENTS

| | | |
|---|---|---|
| DE | 10 361 227 A1 | 7/2005 |
| JP | S48-020232 A | 3/1973 |

(Continued)

OTHER PUBLICATIONS

PCT/ISA/210 from International Application PCT/JP2017/010559 with the English translation thereof.

(Continued)

*Primary Examiner* — Faye M Fleming
(74) *Attorney, Agent, or Firm* — Carrier Blackman & Associates, P.C.; Joseph P. Carrier; Jeffrey T. Gedeon

(57) ABSTRACT

An occupant protection device is provided with: a table disposed at a position facing a seatback; and an airbag disposed in the table. The airbag deploys between the table and the upper body of an occupant sitting on the front surface of the seatback. Due to this configuration, in a vehicle provided with the table, the upper body of the occupant can be favorably protected.

2 Claims, 4 Drawing Sheets

(56) References Cited

U.S. PATENT DOCUMENTS

| | | | |
|---|---|---|---|
| 10,232,815 B1 * | 3/2019 | Dry | B60R 21/207 |
| 10,239,620 B2 * | 3/2019 | Strobl | B64D 11/06205 |
| 10,583,797 B2 * | 3/2020 | Line | B60N 2/42763 |
| 10,766,447 B2 * | 9/2020 | Jung | B60R 21/207 |
| 2013/0276236 A1 * | 10/2013 | Rasmussen | A47G 9/1027 |
| | | | 5/640 |
| 2019/0291680 A1 * | 9/2019 | Baccouche | B62D 21/15 |

FOREIGN PATENT DOCUMENTS

| | | |
|---|---|---|
| JP | S49-92799 A | 9/1974 |
| JP | 2009-208566 A | 9/2009 |

OTHER PUBLICATIONS

Office Action with search report dated Apr. 26, 2021 issued over the corresponding Chinese Patent Application No. 201780088476.7 with a partial English translation thereof.

\* cited by examiner

OCCUPANT PROTECTION DEVICE

TECHNICAL FIELD

The present invention relates to an occupant protection device that protects an occupant by deploying an air bag between the occupant and a table when a collision of a vehicle occurs or the collision is predicted.

BACKGROUND ART

In Japanese Laid-Open Patent Publication No. 2009-208566, a table that is disposed in front of an upper body of an occupant is moved toward the front of the occupant's knees when a collision occurs, so that the contact between the occupant and the table is avoided. Moreover, in this patent literature, an air bag is deployed from the table after the movement, so as to bind and protect the occupant's body below his knees.

SUMMARY OF INVENTION

By the technique in Japanese Laid-Open Patent Publication No. 2009-208566, the occupant's body below his knees is protected by the air bag when the collision occurs. However, from the viewpoint of protecting the upper body of the occupant, there is room for improvement. For example, if the occupant does not wear the seat belt during the use of the table, only the air bag for the occupant's body below his knees is not enough.

The present invention has been made to solve the above problem, and an object is to provide an occupant protection device that can appropriately protect an upper body of an occupant in a vehicle including a table.

An occupant protection device according to the present invention includes: a table that is provided at a position that faces a seat back; and an air bag that is provided to the table, wherein the air bag is configured to be deployed between an upper body of an occupant who is seated on a front side of the seat back and the table.

In the above structure, the air bag is deployed between the upper body of the occupant and the table. Thus, the upper body of the occupant can be appropriately protected. In addition, a position where the air bag is deployed is close to the occupant. Thus, the size of the air bag can be smaller.

An occupant protection device according to the present invention includes: a table that is provided at a position that faces a seat back; and an air bag that is provided to the table, wherein: the table includes a first part on a front side thereof and a second part on a back side thereof; and the air bag is configured to be deployed from between the first part and the second part.

In the above structure, the air bag is deployed at a position where the table is normally used, that is, at the height of the upper body of the occupant. Thus, the upper body of the occupant can be appropriately protected. In addition, the position where the air bag is deployed is close to the occupant. Thus, the size of the air bag can be smaller. Moreover, the deployed air bag is supported by two surfaces of the first part and the second part. Thus, the air bag can be supported more stably.

An occupant protection device according to the present invention includes: a table that is provided at a position that faces a seat back; an air bag that is provided to the table; and a support mechanism configured to support the table in a state where a part of or all of the table is rotatable about a rotation axis that is approximately parallel to a width direction, wherein the part of or all of the table is configured to rotate due to force generated when the air bag is deployed, and turn a reaction force surface of the table with respect to the air bag toward an occupant who is seated on a front side of the seat back.

In the above structure, the air bag is deployed at the position where the table is normally used, that is, at the height of the upper body of the occupant. Thus, the upper body of the occupant can be appropriately protected. In addition, the position where the air bag is deployed is close to the occupant. Thus, the size of the air bag can be smaller. Moreover, the reaction force surface with respect to the air bag can be formed with a simple structure.

The reaction force surface may be a back side of the table that faces downward when the air bag is not deployed, and the air bag may be deployed from a part of the back side of the table that is located more toward the seat back side than a center of the back side of the table in a front-rear direction.

In the above structure, when the air bag is deployed, the back side of the table faces the occupant and the front side of the table faces a side opposite to the occupant. Thus, it can be prevented that an object placed on the front side of the table before the air bag is deployed moves to the occupant side when the air bag is deployed.

The support mechanism 16 may include the rotation axis 18 of the entire table 12 at a front end of the table 12.

In the above structure, the table rotates about the rotation axis at the front end thereof, so that the air bag is deployed at the higher position than that in a normal case. Thus, the upper body of the occupant can be protected easily.

The table may include a first part on a front side thereof and a second part on a back side thereof that support each other using the rotation axis, the reaction force surface may be a back side of the first part that faces a front side of the second part when the air bag is not deployed, and the air bag may be deployed from between the first part and the second part.

In the above structure, the deployed air bag is supported by the two surfaces of the first part and the second part. Thus, the air bag can be supported more stably.

DESCRIPTION OF EMBODIMENTS

Preferred embodiments of an occupant protection device according to the present invention are hereinafter described with reference to the attached drawings. Note that in the description below, an occupant protection device 10 that is provided to a passenger seat is assumed. However, the occupant protection device 10 may be provided for a rear seat, a driver's seat of an automated driving vehicle, or the like.

Figure 1A:
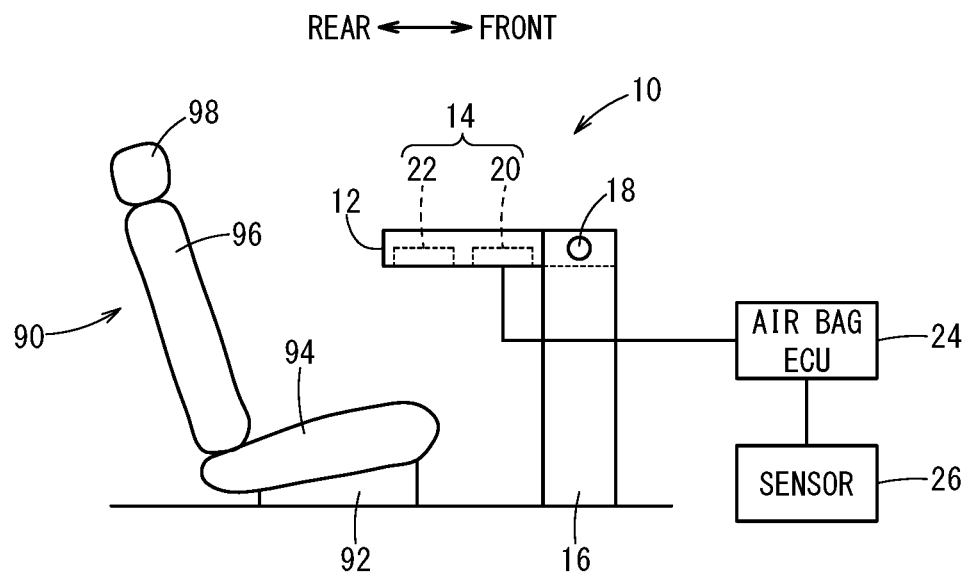
FIG. 1A is a schematic left view that illustrates an occupant protection device according to a first embodiment.
Figure 1B:
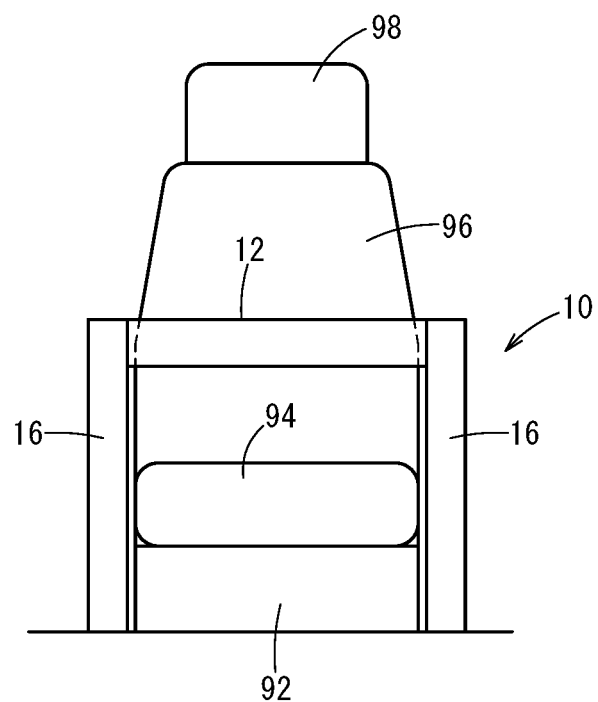
FIG. 1B is a schematic front view that illustrates the occupant protection device according to the first embodiment.

With respect to the occupant protection device 10 according to the present invention, a common part of the embodiments (first embodiment to third embodiment) is described with reference to FIG. 1A and FIG. 1B. A seat 90 on which an occupant is seated is provided in a passenger compartment, and the occupant protection device 10 is provided in front of the seat 90. In the description below, the direction ahead of the seat 90 (and seat back 96) is a front direction, and the direction backward of the seat 90 is a rear direction. In addition, a direction that intersects the seat 90 and a table 12 is a width direction. The front-rear direction is approximately orthogonal to the width direction.

The seat 90 includes a base part 92, a seat cushion 94, the seat back 96, and a headrest 98. The base part 92 is attached to a floor panel so that the base part 92 is movable in the front-rear direction and/or is rotatable using an up-down direction as a center axis. The seat cushion 94 is fixed to an upper part of the base part 92, and an occupant O (FIG. 2A, for example) is seated on the seat cushion 94. The seat back 96 extends upward from a rear end of the seat cushion 94 and can swing in the front-rear direction. The headrest 98 is fixed to an upper end of the seat back 96.

The occupant protection device 10 includes the table 12 that is provided at a position that faces the seat back 96, an air bag unit 14 that is provided to the table 12, and support mechanisms 16, 16 that support the table 12.

The table 12 is positioned in front of an upper body UB of the occupant O (FIG. 2A, for example) who is seated on the front side of the seat back 96. The table 12 includes a rotation axis 18 that is partially or entirely parallel to the width direction. A part of or all of the table 12 receives propulsion force due to deployment of an air bag 22 so as to rotate in the front direction about the rotation axis 18. Note that the table 12 may be rotated in the front direction by driving force of an actuator. In this case, an air bag ECU 24 to be described below outputs a driving signal to a driving circuit of the actuator. The part of or all of the table 12 that has rotated in the front direction functions as a reaction force surface when the air bag 22 is deployed as described below.

The air bag unit 14 includes a gas generation device 20 such as an inflator that is controlled by the air bag ECU 24, and the air bag 22. The air bag ECU 24 determines a whether collision has occurred, on the basis of a signal that is output from a sensor 26 (G sensor, pressure sensor, or the like), and if it is determined that the collision has occurred, the air bag ECU 24 outputs a gas generation instruction to the gas generation device 20. In accordance with the gas generation instruction that is output from the air bag ECU 24, the gas generation device 20 ignites powder, so that a gas generating agent is burned. Thus, gas is generated. When the gas is generated, the air bag 22 is deployed between the seat back 96 and the table 12, that is, between the upper body UB (FIG. 2A, for example) of the occupant O who is seated on the front side of the seat back 96 and the table 12. A deployment direction of the air bag 22 is decided on the basis of the shape or the posture of the reaction force surface of the table 12, the shape of the air bag 22, or the like.

The support mechanisms 16, 16 are provided at a right side and a left side so as to have the seat 90 therebetween, and support both left and right sides of the table 12. As the support mechanisms 16, 16, for example, armrests, a console, or the like can be used. Note that the support mechanism 16 may be provided to one of the right side and the left side of the seat 90 so as to support one side of the table 12. Moreover, the support mechanisms 16, 16 may be provided to any part of the seat 90, for example, the base part 92. In this case, the support mechanisms 16, 16 move and rotate together with the seat 90. Furthermore, the support mechanisms 16, 16 may have one or more joints, and in this case, the table 12 can move in the front-rear direction or the up-down direction. In addition, the table 12 may be supported by one support mechanism 16 so that the table 12 can rotate about an axis that is parallel to the front-rear direction, and by another support mechanism 16 so that the table 12 is attachable to and detachable from said another support mechanism 16. Alternatively, the table 12 may be supported by one support mechanism 16 so that the table 12 can rotate about an axis that is parallel to the up-down direction, and by another support mechanism 16 so that the table 12 is attachable to and detachable from the other support mechanism 16. If the table 12 is detachably attached to the support mechanism 16, a mechanism that locks the table 12 when the table 12 is attached to the support mechanism 16 may be provided.

1. First Embodiment

The first embodiment is described with reference to FIG. 2A to FIG. 2C. With respect to the occupant protection device 10 according to the first embodiment, the entire table 12 can rotate in the front-rear direction. The table 12 has the rotation axis 18 that is parallel to the width direction near the front end of the table 12. The support mechanisms 16, 16 support the table 12 in a state where the table 12 can rotate about the rotation axis 18. The support mechanisms 16, 16 restrict the rotation range of the table 12 by a restriction mechanism (not shown). For example, the support mechanisms 16, 16 cause the table 12 to rotate between a position (FIG. 2A) where the table 12 is approximately horizontal and a position (FIG. 2C) where the table 12 is approximately vertical. The rotation range of the table 12 can be set appropriately.

The air bag 22 is stored in a part of the table 12 that is located rearward of the center thereof in the front-rear direction. Moreover, a rear end of a back side 12B of the table 12 has the strength of such a degree that the rear end of the back side 12B can be broken by the air bag 22 that is supplied with the gas. Thus, the air bag 22 can be deployed from the back side 12B of the table 12 toward an approximately vertical direction of the back side 12B.

Figure 2A:
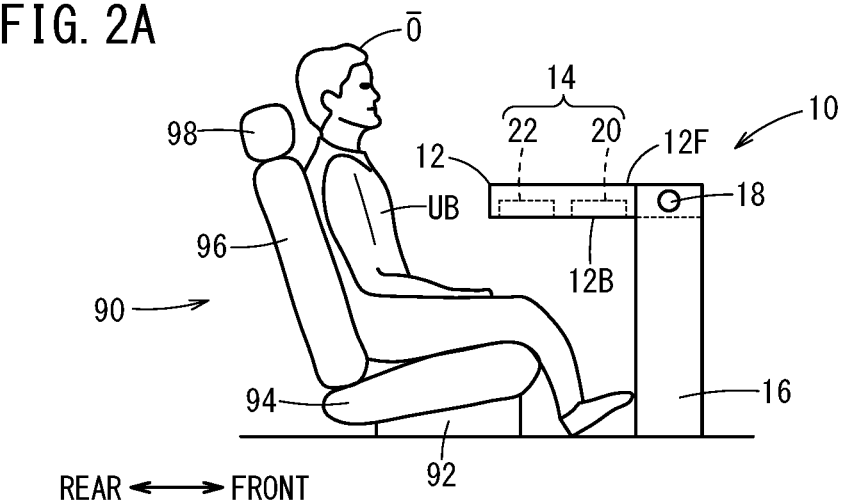
FIGS. 2A, 2B, and 2C are state transition diagrams of the occupant protection device according to the first embodiment.
Figure 2B:
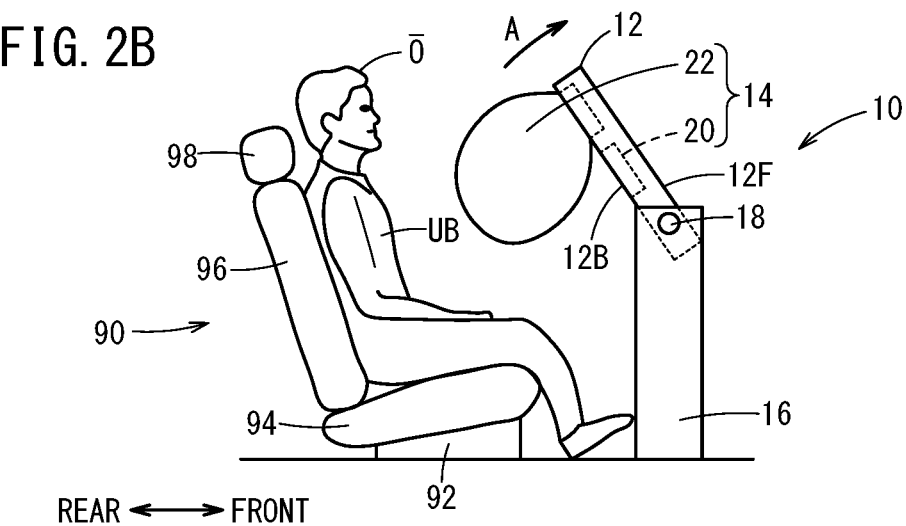
Figure 2C:
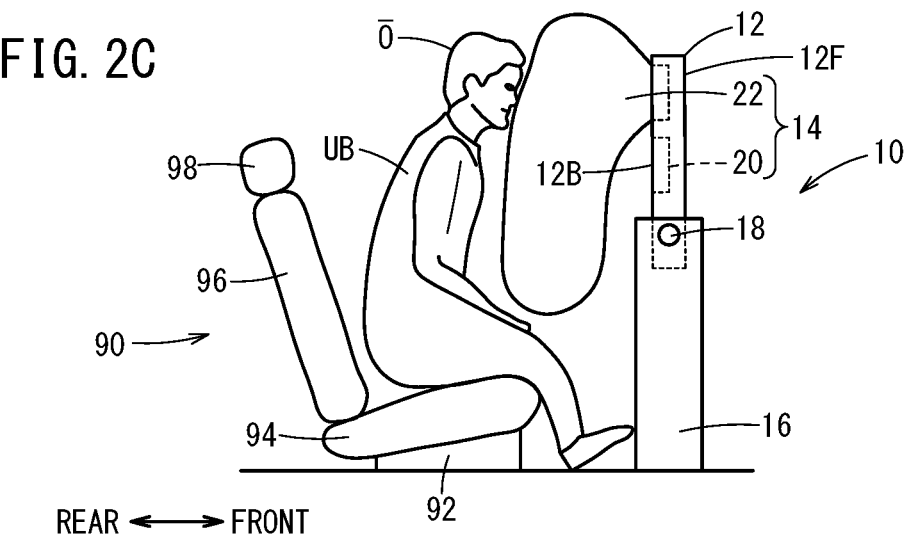

As illustrated in FIG. 2A, in ordinary use, the table 12 is disposed in front of (front direction) the occupant O who is seated on the seat 90. At this time, the table 12 is approximately horizontal. The back side 12B faces downward. When the collision occurs, the air bag ECU 24 (FIG. 1) outputs the gas generation instruction, and the gas generation device 20 generates the gas. Momentary inflation of the gas applies the upward propulsion force to a rear end of the table 12. On the other hand, a front end of the table 12 is rotatably supported by the support mechanism 16. Thus, as indicated by an arrow A in FIG. 2B, the table 12 rotates in the front direction about the rotation axis 18. As the table 12 rotates, the air bag 22 is deployed from the back side 12B of the table 12 toward the front of the occupant O. As illustrated in FIG. 2C, when the table 12 becomes approximately vertical, a rotation operation of the table 12 in the front direction is restricted by the restriction mechanism of the support mechanisms 16, 16. The air bag 22 is deployed between the upper body UB of the occupant O and the table 12 using the back side 12B of the table 12 as the reaction force surface, and binds the occupant O who moves in the front direction.

2. Second Embodiment

Figure 3A:
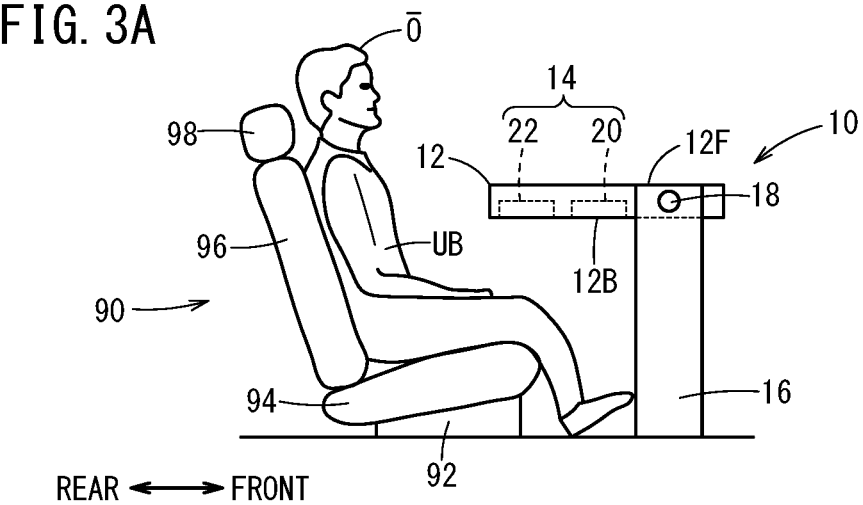
FIGS. 3A, 3B, and 3C are state transition diagrams of an occupant protection device according to a second embodiment.
Figure 3B:
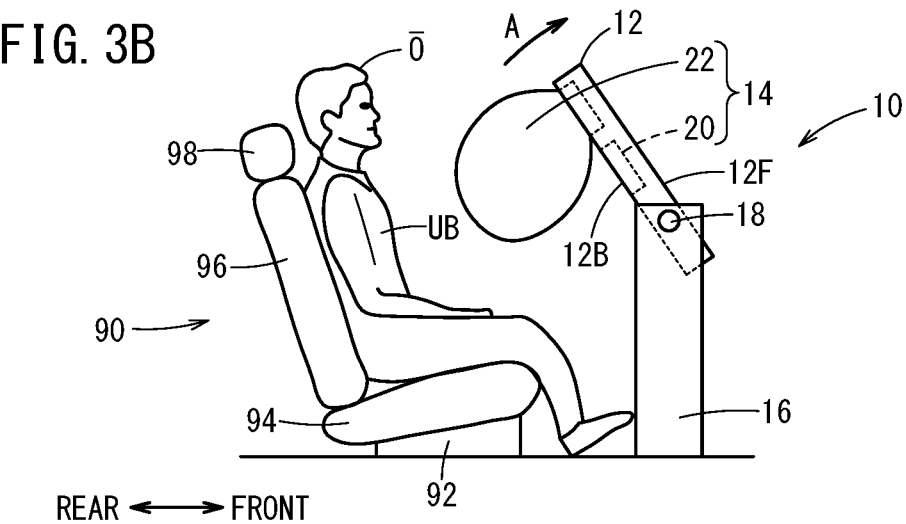
Figure 3C:
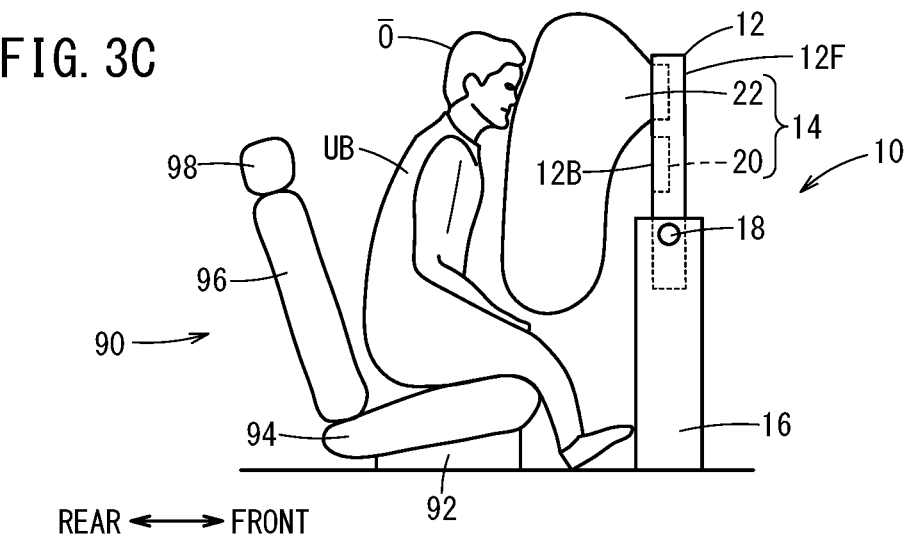

The second embodiment is described with reference to FIG. 3A to FIG. 3C. In the occupant protection device 10 according to the second embodiment, the entire table 12 can rotate in the front-rear direction. The table 12 has, between the center and the front end thereof in the front-rear direction, the rotation axis 18 that is parallel to the width direction. Except for the position of the rotation axis 18 in the front-rear direction, a structure of the occupant protection device 10 according to the second embodiment is the same as the structure of the occupant protection device 10 according to the first embodiment.

3. Third Embodiment

The third embodiment is described with reference to FIG. 4A to FIG. 4C. In the occupant protection device 10 according to the third embodiment, a part of the table 12 can rotate in the front-rear direction. The table 12 includes a first part 121 on a front side thereof and a second part 122 on the back side thereof. In a state where the table 12 is approximately parallel to the horizontal direction, the first part 121 is disposed above the second part 122. An approximately front end of the first part 121 has the rotation axis 18 that is parallel to the width direction. The second part 122 supports the first part 121 in a state where the first part 121 can rotate about the rotation axis 18. The support mechanisms 16, 16 support the second part 122 so that the second part 122 does not rotate in the front-rear direction. The table 12 restricts the rotation range of the first part 121 by a strip member 123. The strip member 123 has one end thereof fixed to the first part 121 and the other end thereof fixed to the second part 122. The strip member 123 is provided to each side of the table 12 in the width direction. For example, the strip member 123 is stretched at a position (FIG. 4C) where the first part 121 is approximately orthogonal to the second part 122. That is to say, the strip member 123 can rotate between a position (FIG. 4A) where the first part 121 is approximately horizontal and a position (FIG. 4C) where the first part 121 is approximately vertical. The rotation range of the first part 121 can be set appropriately.

The air bag 22 is stored in a part of the first part 121 that is rearward of the center thereof in the front-rear direction. Moreover, a rear end of a back side 121B of the first part 121 has the strength of such a degree that the rear end of the back side 121B can be broken by the air bag 22 that is supplied with the gas. Thus, the air bag 22 can be deployed from the back side 121B of the first part 121 toward the approximately vertical direction of the back side 121B.

Figure 4A:
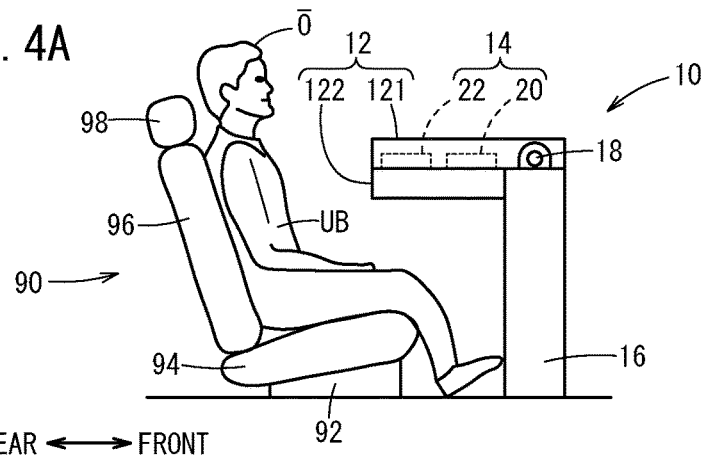
FIGS. 4A, 4B, and 4C are state transition diagrams of an occupant protection device according to a third embodiment.
Figure 4B:
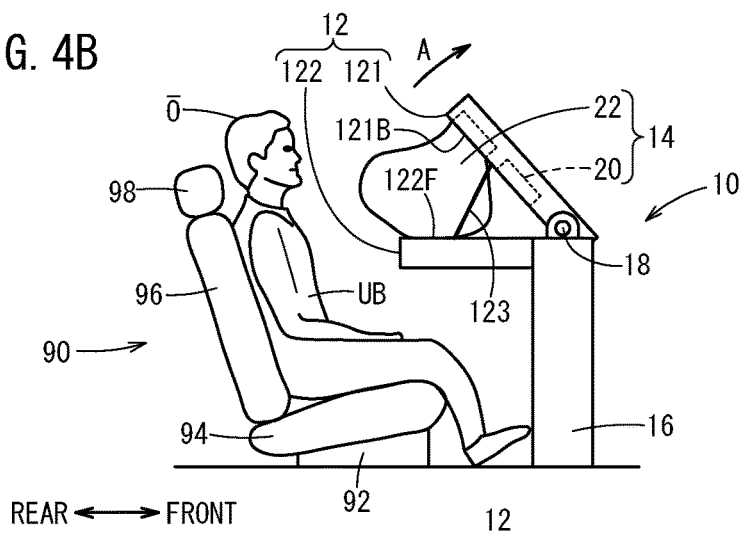
Figure 4C:
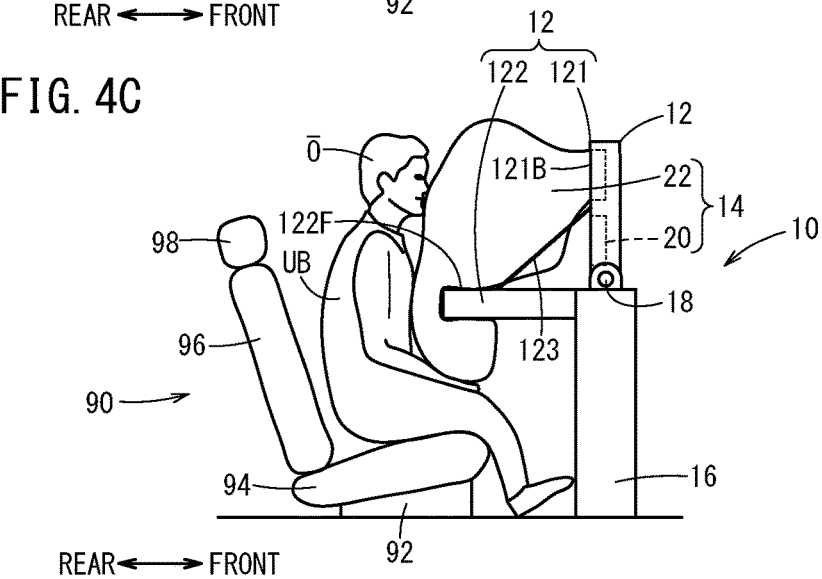

As illustrated in FIG. 4A, in ordinary use, the table 12 is disposed in front of the occupant O who is seated on the seat 90. At this time, the table 12 is approximately horizontal. The back side 121B of the first part 121 and a front side 122F of the second part 122 are in contact with each other. When the collision occurs, the air bag ECU 24 (FIG. 1) outputs a gas generation instruction, and the gas generation device 20 generates gas. The instantaneous inflation of the gas applies the upward propulsion force to a rear end of the first part 121. On the other hand, a front end of the first part 121 is rotatably supported by the second part 122. Thus, as indicated by the arrow A in FIG. 4B, the first part 121 rotates in the front direction about the rotation axis 18. As the first part 121 rotates, the air bag 22 is deployed from the back side 121B of the first part 121 toward the front of the occupant O. As illustrated in FIG. 4C, when the first part 121 becomes approximately vertical, a rotation operation of the first part 121 in the front direction is restricted by the strip member 123. The air bag 22 is deployed between the upper body UB of the occupant O and the table 12 using two surfaces of the back side 121B of the first part 121 and the front side 122F of the second part 122 as the reaction force surface, and binds the occupant O who moves in the front direction.

4. Modifications

In the first embodiment and the second embodiment, the air bag 22 is stored in the table 12. However, the air bag 22 may be attached to the back side 12B of the table 12.

In the third embodiment, the air bag 22 is stored in the first part 121. However, the air bag 22 may be stored in the second part 122 instead. In this case, the first part 121 jumps up due to the instantaneous inflation of the gas. In addition, in order to deploy the air bag 22 toward the occupant O, it is preferable that the rotation angle of the first part 121 with respect to the second part 122 is smaller than a right angle.

5. Summary of Embodiments

The occupant protection device 10 according to each embodiment includes: the table 12 that is provided at the position that faces the seat back 96; and the air bag 22 that is provided to the table 12. The air bag 22 is configured to be deployed between the upper body UB of the occupant O who is seated on the front side of the seat back 96 and the table 12. In the above structure, since the air bag 22 is deployed between the upper body UB of the occupant O and the table 12, the upper body UB of the occupant O can be appropriately protected. In addition, the position where the air bag 22 is deployed is close to the occupant O. Thus, the size of the air bag 22 can be smaller.

Moreover, the occupant protection device 10 according to the third embodiment has the following aspect. That is to say, the occupant protection device 10 includes: the table 12 that is provided at the position that faces the seat back 96; and the air bag 22 that is provided to the table 12. The table 12 includes the first part 121 on the front side thereof and the second part 122 on the back side thereof. The air bag 22 is configured to be deployed from between the first part 121 and the second part 122. In the above structure, the air bag 22 is deployed at the position where the table 12 is normally used, that is, at the height of the upper body UB of the occupant O. Thus, the upper body UB of the occupant O can be appropriately protected. In addition, the position where the air bag 22 is deployed is close to the occupant O. Thus, the size of the air bag 22 can be smaller. Moreover, the deployed air bag 22 is supported by the two surfaces of the first part 121 and the second part 122. Thus, the air bag 22 can be supported with more stably.

The occupant protection device 10 according to each embodiment also has the following aspect. That is to say, the occupant protection device 10 includes: the table 12 that is provided at the position that faces the seat back 96; the air bag 22 that is provided to the table 12; and the support mechanism 16 configured to support the table 12 in the state where the part of or all of the table 12 can rotate about the rotation axis 18 that is approximately parallel to the width direction. The part of or all of the table 12 is configured to rotate due to the force generated when the air bag 22 is deployed, and turn the reaction force surface of the table 12 with respect to the air bag 22 toward the occupant O who is seated on the front side of the seat back 96. In the above structure, the air bag 22 is deployed at the position where the table 12 is normally used, that is, at the height of the upper body UB of the occupant O. Thus, the upper body UB of the occupant O can be appropriately protected. In addition, the position where the air bag 22 is deployed is close to the occupant O. Thus, the size of the air bag 22 can be small.

Moreover, the reaction force surface with respect to the air bag 22 can be formed with a simple structure.

In the first embodiment and the second embodiment, the reaction force surface is the back side 12B of the table 12 that faces downward when the air bag 22 is not deployed. The air bag 22 is configured to be deployed from the part of the back side 12B of the table 12 that is located more toward the seat back 96 side than the center of the back side 12B of the table 12 in the front-rear direction. In the above structure, when the air bag 22 is deployed, the back side 12B of the table 12 faces the occupant O and the front side 12F of the table 12 faces the side opposite to the occupant O. Thus, it can be prevented that the object placed on the front side 12F of the table 12 before the air bag 22 is deployed moves to the occupant O side when the air bag 22 is deployed.

In the first embodiment, the support mechanism 16 has the rotation axis 18 of the entire table 12 at the front end of the table 12. In the above structure, the air bag 22 is deployed at a higher position. Thus, the upper body UB of the occupant O can be protected easily.

In the above structure, the table 12 rotates about the rotation axis 18 located at the front end thereof, so that the air bag 22 is deployed at a higher position than that in a normal case. Thus, the upper body UB of the occupant O can be protected easily.

The invention claimed is:

1. An occupant protection device comprising:
    a table that is provided at a position that faces a seat back;
    an air bag that is provided to the table; and
    a support mechanism configured to support the table in a state where a part of or all of the table is rotatable about a rotation axis that is approximately parallel to a width direction, wherein the part of or all of the table is configured to rotate due to force generated when the air bag is deployed, and turn a reaction force surface of the table with respect to the air bag toward an occupant who is seated on a front side of the seat back,
    wherein the reaction force surface is a back side of the table that faces downward when the air bag is not deployed,
    wherein the air bag is configured to be deployed from a part of the back side of the table that is located more toward the seat back side than a center of the back side of the table in a front-rear direction, and
    wherein the support mechanism includes the rotation axis of the entire table at a front end of the table.

2. The occupant protection device according to claim 1, wherein:
    a second table is provided on a back side of the table and supports the table using the rotation axis;
    the reaction force surface is the back side of the table that faces a front side of the second table when the air bag is not deployed; and
    the air bag is configured to be deployed from between the table and the second table.

* * * * *